United States Patent
Osby et al.

(10) Patent No.: US 9,469,954 B2
(45) Date of Patent: *Oct. 18, 2016

(54) WAVE ATTENUATOR

(71) Applicants: Tim Osby, Sandy Springs, GA (US); Max Volk, Winder, GA (US)

(72) Inventors: Tim Osby, Sandy Springs, GA (US); Max Volk, Winder, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/835,579

(22) Filed: Aug. 25, 2015

(65) Prior Publication Data

US 2015/0361628 A1 Dec. 17, 2015

Related U.S. Application Data

(63) Continuation of application No. 13/732,128, filed on Dec. 31, 2012, now Pat. No. 9,115,476.

(60) Provisional application No. 61/581,291, filed on Dec. 29, 2011.

(51) Int. Cl.
*E02B 3/06* (2006.01)
*E02B 7/02* (2006.01)

(52) U.S. Cl.
CPC *E02B 3/062* (2013.01); *E02B 7/02* (2013.01)

(58) Field of Classification Search
CPC .............. E02B 3/06; E02B 3/062; E02B 7/02
USPC ............... 405/21, 26, 63, 23, 25, 27, 28, 30, 405/68–70
See application file for complete search history.

(56) References Cited

U.S. PATENT DOCUMENTS

| | | |
|---|---|---|
| 1,004,718 A | 10/1911 | Wieland |
| 1,847,043 A | 2/1932 | Ball |
| 2,044,795 A | 6/1936 | Knight |
| 2,185,458 A | 1/1940 | Giliasso |
| 3,487,645 A | 1/1970 | Frankel |
| 4,136,994 A | 1/1979 | Fuller |
| 4,146,344 A | 3/1979 | Steen |
| 4,715,744 A | 12/1987 | Richey |
| 4,997,310 A | 3/1991 | Rasmussen |
| 5,195,842 A | 3/1993 | Sakow |
| 5,707,172 A | 1/1998 | Wilcox |
| 6,102,616 A | 8/2000 | Foote |
| 6,305,877 B1 | 10/2001 | Cavanagh |
| 6,715,958 B2 | 4/2004 | Wittenberg |
| 6,767,162 B2 | 7/2004 | Myers |
| 7,575,396 B2 | 8/2009 | Cederlund |
| 8,132,986 B2 | 3/2012 | Wittenberg |
| 8,287,209 B2 | 10/2012 | Feldman |
| 2005/0042033 A1 | 2/2005 | Fong |
| 2009/0162144 A1 | 6/2009 | Ayre |
| 2013/0236248 A1 | 9/2013 | Cyr |

FOREIGN PATENT DOCUMENTS

KR 2003053669 7/2003

*Primary Examiner* — Sunil Singh
(74) *Attorney, Agent, or Firm* — Jones IP Law, LLC; Dennis W. Jones (57) ABSTRACT

A floating wave attenuator including a plurality of elongated pipes, each including a plurality of corrugated pipes connected end-to-end, wherein the elongated pipes are secured together into a triangular formation oriented substantially between a protected area and anticipated wave activity, to provide a cross section against the wave activity, an opening at each end of the elongated pipes, for providing the elongated pipes to be substantially filled with water due to wave activity, and a plurality of cables for securing a selected corrugated pipe at its desired location within the water.

18 Claims, 5 Drawing Sheets

WAVE ATTENUATOR

CROSS-REFERENCE TO RELATED APPLICATIONS

This application is a continuation application of, and claims the benefit of and priority to U.S. patent application Ser. No. 13/732,128, entitled "Wave Attenuator," filed Dec. 31, 2012, which claims the benefit of U.S. Provisional Application No. 61/581,291, filed Dec. 29, 2011, each of which is incorporated herein by reference as if set forth herein in its entirety.

BACKGROUND

This disclosure pertains to floating wave attenuation and breakwater systems. More particularly, this invention pertains to a wave attenuator for dissipating wave energy to protect shorelines against wave damage and erosion, while also protecting docks, moorings, boats and the like from the tremendous power and force of the wave action. Floating wave attenuators use the action of the wave to dissipate itself and remove the energy traveling in the waves.

Floating wave attenuators of varying types have been in use for many years. Some examples of floating wave attenuators include hollow concrete structures, floating docks with various items hung from underneath, and even old tires strung together.

The general physical principles that relate to the wave attenuating ability of a specific floating breakwater are reflection, absorption, and turbulence.

Another method for stopping waves is reflection such as in bulkheads. Reflection is provided by a barrier that reflects the wave rather than allowing it to pass through.

A large mass, such as provided by large floating concrete breakwaters, provides for absorption of the wave energy.

A well known turbulence-generating breakwater is the common floating scrap-tire breakwater. It is made by connecting tires together and floating them with cubes of Styrofoam, for example. The floating scrap-tire breakwater attenuates waves through a loss of energy caused by multiple openings and "traps" that the water must pass through. In its simplest form, the maze of channels exhausts the force of the wave on its way through.

BRIEF SUMMARY

According to one embodiment of the present invention, a floating wave attenuator is provided that includes at least one elongated pipe, each elongated pipe including a plurality of corrugated pipes connected end-to-end, the corrugated pipes oriented substantially between a protected area and expected wave activity to provide a cross section against the wave activity, a plurality of anchors, situated opposite other anchors having at least one corrugated pipe between the opposing anchors, and a plurality of cables for securing a selected corrugated pipe to one of the anchors.

In one embodiment, the elongated pipes are secured in a triangular formation as viewed from the ends of the respective elongated pipes. The floating wave attenuator is sometimes oriented substantially perpendicular to anticipated wave activity.

In another embodiment, each corrugated pipe includes a double-wall. The double-wall includes space between the walls to provide buoyancy to the corrugated pipe. The space includes among others, air, or a material that is lighter than water.

In another embodiment, the cables include cable pairs, including a first cable of fixed length and a second cable of elasticized length capacity to provide wherein the first cable provides a fixed reference depth for the floating wave attenuator relative to the water surface and the second cable provides mobility of the floating wave attenuator to maintain the reference depth during fluctuations of the water level.

In another embodiment, each end of an elongated pipe includes a detachable cover to provide a specified coverage of the respective end so that water flow into and out of the respective elongated pipe is reduced.

In another embodiment, a floating wave attenuator includes a plurality of elongated pipes that include multiple pipe sections connected end-to-end, and the elongated pipe is oriented substantially between a protected area and an anticipated wave activity area, an opening at each end of the elongated pipes, for providing the elongated pipes to be substantially filled with water due to the wave activity, a triangular formation, where the elongated pipes are secured together in a triangular formation as viewed from each end to provide a cross section against wave activity, and a plurality of cables, for securing a selected pipe section in position relative to the desired location within the water.

In yet another embodiment, a method for wave attenuation is provided that includes assembling a plurality of elongated pipes by connecting corrugated pipes end-to-end, so that the respective elongated pipe has an opening at each end for water flow into and out of the respective elongated pipe, securing the elongated pipes into a wave attenuator with a triangular formation as viewed from each end of the elongated pipes, orienting the wave attenuator between a protected area and an anticipated wave activity area so that the wave attenuator forms a measurable cross section against the anticipated wave activity, and using cables to secure the wave attenuator in position relative to the wave activity area, so that waves advancing against the wave attenuator are dissipated and the energy of the waves is reduced.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The above-mentioned features will become more clearly understood from the following detailed description read together with the drawings in which.

DETAILED DESCRIPTION

A floating wave attenuator that provides for dissipating wave energy to protect shorelines against wave damage and erosion, while also protecting harbors, docks, moorings, boats and the like from the tremendous power and force of the wave action is disclosed. In a typical configuration, corrugated pipe is used as a mechanism for wave attenuation.

In various embodiments, the floating wave attenuator incorporates floats in the pipe, the pipe itself, or pockets within the pipe as the buoyancy for the wave attenuator. Such embodiments eliminate the need for external structures to provide for buoyancy.

The corrugated pipe is made from plastic, metal, or other materials to provide a structure that reduces or eliminates much of the cost typically associated with such devices. In some embodiments, the corrugated pipe includes a double-wall, so that the space between the walls is optionally plugged or filled with lighter-than-water materials to provide buoyancy. In some embodiments, all sections of the pipe are plugged to create buoyancy. In some embodiments standard or customized floats are inserted into the pipe to provide buoyancy.

A buoyant pipe is secured in place via standard methods as is known in the art. In additional embodiment, attaching items to the pipe provides for creation of a walking surface, a roof structure, signage, among other uses.

A wave attenuator of any desirable length is provided by assembling multiple corrugated pipe sections that are joined in an end-to-end fashion. Wave attenuation is improved even further by assembling multiple elongated pipes in a triangle fashion, as viewed from the end of the pipes. Such triangular construction is provided in groupings of 3, 6 or even more corrugated pipe lengths.

Ballast and/or floats are added to the pipe sections to improve the performance and/or to maintain proper orientation and depth of the wave attenuator within the water.

Figure 1:
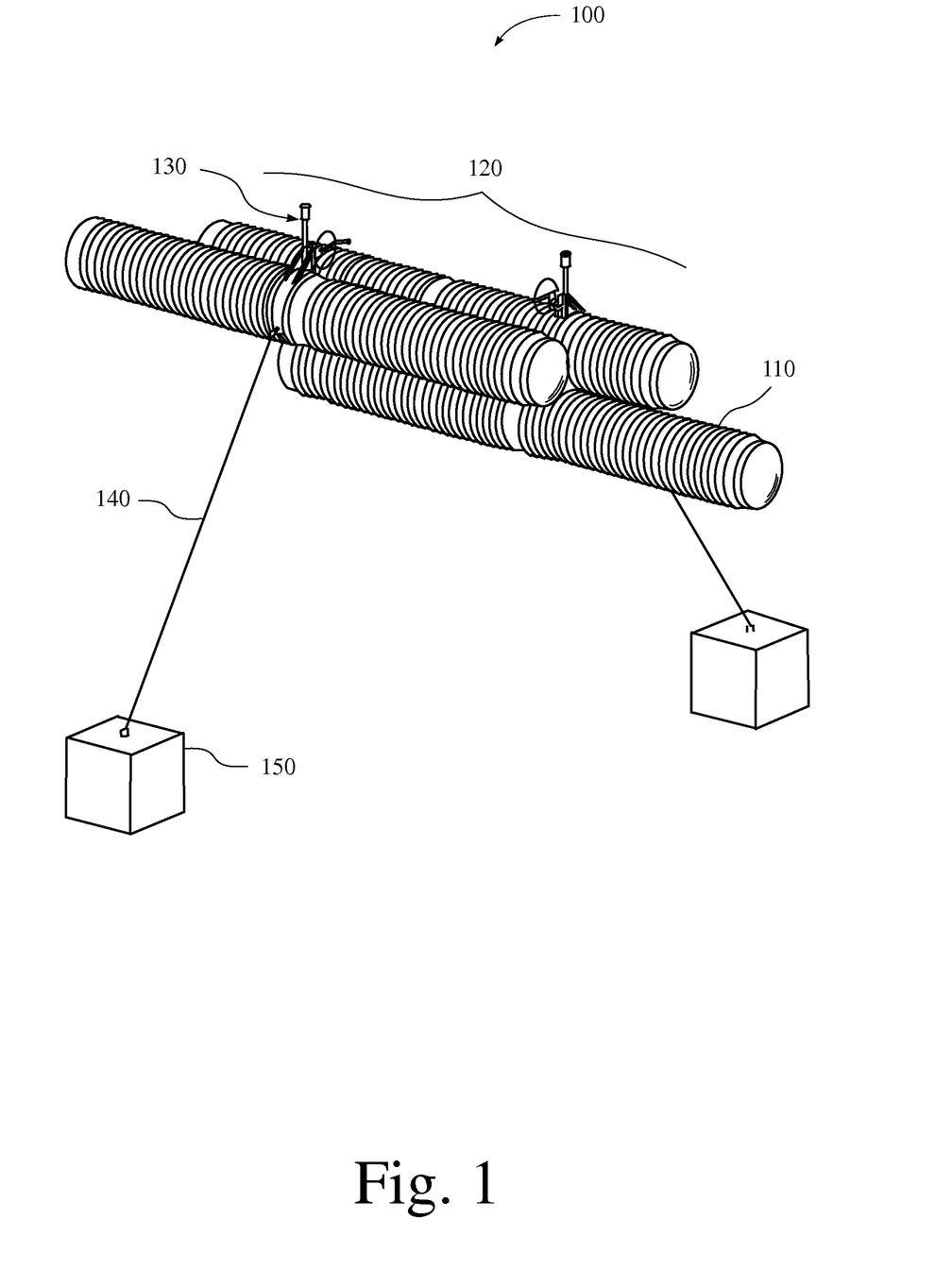
FIG. 1 is a perspective view of a wave attenuator secured via cables.
Figure 2:
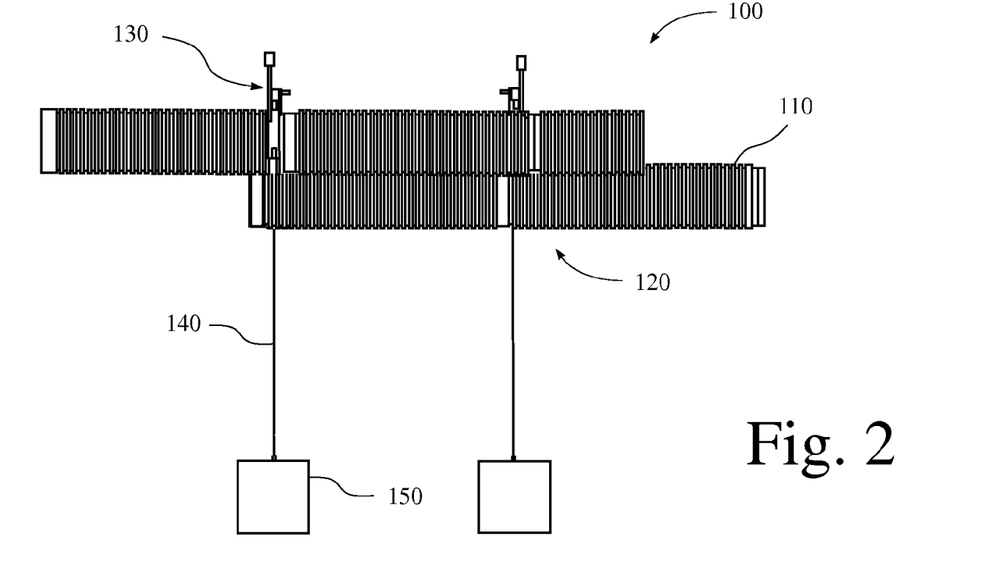
FIG. 2 is a side view of the wave attenuator as in FIG. 1.
Figure 3:
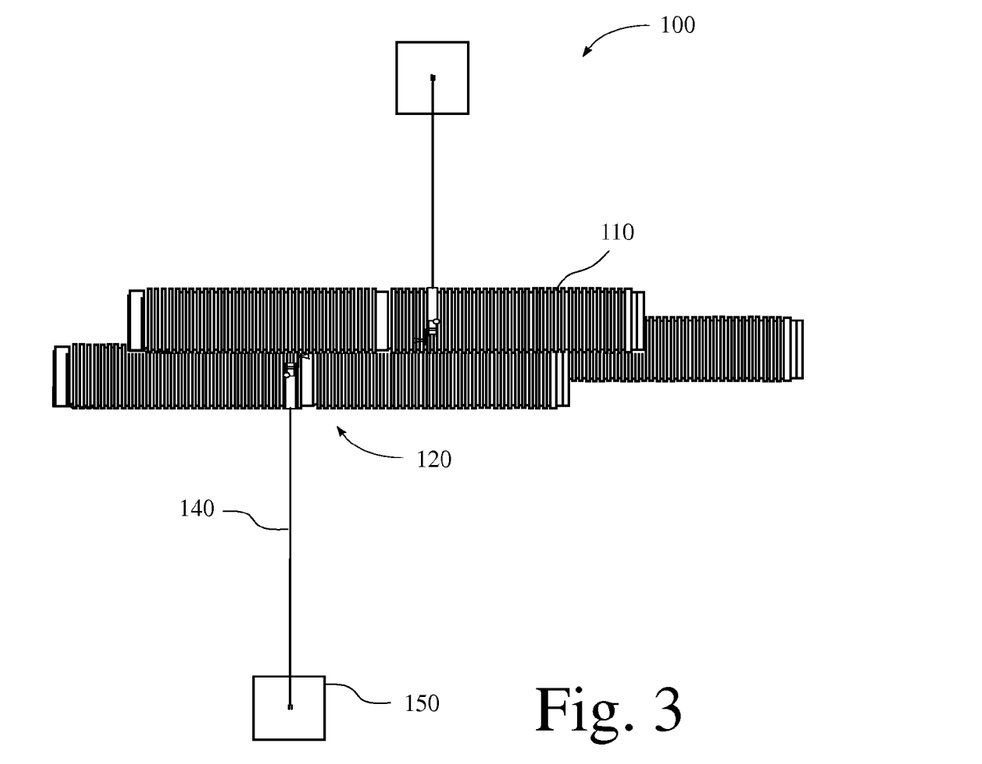
FIG. 3 is a top view of the wave attenuator as in FIG. 1.
Figure 4:
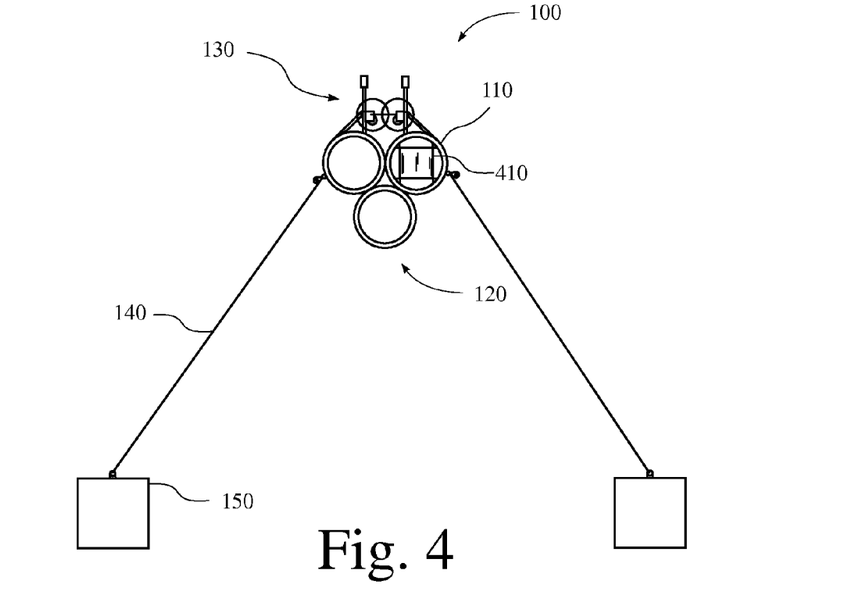
FIG. 4 is an end view of the wave attenuator as in FIG. 1.

Turning attention to the drawings, FIG. 1 is a perspective view of one embodiment of a wave attenuator 100 as secured via cables 140 to weighted anchors 150. FIG. 2, FIG. 3, and FIG. 4 illustrate a side view, a top view, and an end view respectively of the wave attenuator 100. The illustrated wave attenuator 100 includes three elongated pipes 120 adjoined in a substantially triangular formation as viewed from either end of the elongated pipes 120. Each elongated pipe 120 includes multiple pipe sections 110 connected end-to-end. Those of skill in the art will readily appreciate that any number of elongated pipes 120 of varying lengths may be adjoined to provide suitable wave attenuation in accordance with the size of the body of water in which the wave attenuator 100 is utilized. Typical triangular configurations will include three (1-2), six (1-2-3), or more elongated pipes 120 adjoined together.

One alternative embodiment of the wave attenuator 100 includes a single elongated pipe 120 (made up of a suitable number of pipe sections 110 connected end-to-end). In such an embodiment, the pipe sections 110 (and the resulting elongated pipe 120) would typically have a diameter larger than that of an assemblage of multiple elongated pipes 120.

The multiple elongated pipes 120 are secured together via a fastening mechanism such as are commonly known. For example, a pipe section 110 within one elongated pipe 120 is fastenable to another pipe section 110 within a separate elongated pipe 120 via bolts. Alternatively, the multiple elongated pipes 120 are securable via wrapping cables around the perimeter of group of elongated pipes 120 at periodic intervals along their length.

In some embodiments, the wave attenuator 100 includes winches 130 at periodic intervals for adjusting the tension within the cables 140 that connect the wave attenuator 100 to the weighted anchors 150. In other embodiments, winches 130 are not included so that the cables are adjusted in accordance with the particular method for securing the wave attenuator 100.

The weighted anchors 150 include a fastener for attaching to the cable 140 and otherwise are of any suitable material having sufficient weight to substantially maintain the wave attenuator 100 at a given location within the body of water. One exemplary weighted anchor 150 is a deadman anchor that is typically made of concrete and includes at least one metal fastener. In such an embodiment, the cable 140 is attached to the fastener on the deadman anchor which is then positioned at a desired location along with other deadman anchors as necessary to maintain the wave attenuator 100 at the desired location. In other embodiments the weighted anchors 150 are replaced with other anchoring mechanisms so that the cables 140 are secured to the varying type anchor mechanisms as understood by those of skill in the art. Such varied anchor mechanisms include both below water surface and above water mechanisms.

In a typical embodiment, the pipe sections 110 are corrugated pipes. Such corrugated pipes 110 include alternating furrows and ridges at the outside surface of and encircling the pipe section 110. The corrugations on the outside of the pipe sections 110 contribute to deflecting and breaking up the flow of the advancing waves. In another typical embodiment the pipe sections 110 include a double-wall that provides an additional space for providing buoyancy to the pipe section 110 and thus for the elongated pipe 120. The double-walled pipe sections 110 are discussed further below.

The pipe sections 110 are made from plastic, metal, or other suitable material as is commonly known. The dimensions for the pipe sections 110 vary according to the particular use and the size of the lake or other body of water in which the wave attenuator 100 is utilized. Pipe sections 110 vary in dimension and are available in suitable sizes typically ranging from 2 to 5 feet in diameter with a typical length of 20 feet. Of course different sizes may be used when the situation warrants without departing from the scope of the present invention.

In one embodiment, the elongated pipes 120 are open at both ends. The open ends allow for the water to substantially fill the inside of the elongated pipes 120. The water within the elongated pipes 120 equates to a large mass which provides a substantial resistance against the advancing waves. The water is trapped sufficiently within the elongated pipes 120 to act as ballast and assist in retarding up and down movement of the wave attenuator 100 in response to the wave action. Essentially, the mass of the added water is added to the mass of the elongated pipes 120 to dampen the wave action. Further, the depth and roundedness of the wave attenuator 100 deflects the impacting waves downward so that each wave becomes more likely to undergo its normal rolling cycle than having much of its energy exerted in the form of a horizontal force component against the wave attenuator 100.

It should be noted that the ends of the elongated pipes 120 may be as open or as closed as necessary to provide for maintaining a minimal amount of water within the elongated pipes 120 of the wave attenuator 100 for any specific level of targeted buoyancy. In various embodiments, the ends of the elongated pipes 120 are open or closed in varying amounts as necessary at one or both ends according to the desired level of provided buoyancy and, as a result, the desired level of the wave attenuator 100 with respect to the water surface.

In one embodiment, each end of an elongated pipe 120 is partially covered with a plate 410 of sufficient size to allow water to flow while providing resistance to the water flow. Only a single plate 410 is shown on the end of a single elongated pip 120 for clarity. Such plates 410 are made of plastic, metal, or other suitable material. Further, the plates 410 can be mesh, bars, or substantially solid while not covering the entire end of the elongated pipe 120. In this way water is maintained within the elongated pipes 120 to provide mass, while also preventing large objects from entering the elongated pipes 120. Additionally, the optional plates 410 provide a safety feature being of sufficient size to prevent people from swimming into the elongated pipes 120.

The diameter and length of the elongated pipes 120 and also the number of pipe sections 110 in each elongated pipe 120 varies according to the particular use. The diameter of the pipe sections 110 (and the resulting elongated pipe 120) can be increased to provide a larger cross section against the approaching waves. Of course, the number of elongated pipes 120 can also be increased to provide the desired increase in cross section.

As will be noted in the side view shown in FIG. 2 and top view shown in FIG. 3, the opposing weight anchors 150 connected to opposite sides of the wave attenuator 100 are offset from one another. This offset provides increased flexibility in the back-and-forth movement of the wave attenuator 100 as the waves approach and recede with the tide.

The wave attenuator 100 is installed by first connecting the pipe sections 110 end-to-end to form the desired number of elongated pipes 120. The elongated pipes 120 are assembled substantially between a protected area and the anticipated wave activity. In some installations, the elongated pipes 120 are oriented substantially perpendicular to the anticipated wave activity to provide a cross section against the approaching waves. Such an orientation will often be generally parallel with the shoreline. In one such installation opposing weight anchors 150 are situated having one weight anchor 150 within the protected area and the other weight anchor 150 toward the deeper water from whence the waves approach. The cables 140 are typically attached first to the weight anchor 150 and then attached to a fastener on the pipe section 110 of the elongated pipe 120. In one embodiment, the winch 130 optionally provides for adjusting the tension of the cable 140 to provide stability to the wave attenuator 100 so that it is secured from excessive movement within the desired location.

In some installations, the cables 140 are secured to pilings, moorings, or other such systems for securing water-bound materials and/or craft. In such configurations, the cables are secured and/or adjusted via any suitable methodology such as is common for securing water-bound materials and/or craft.

Figure 5:
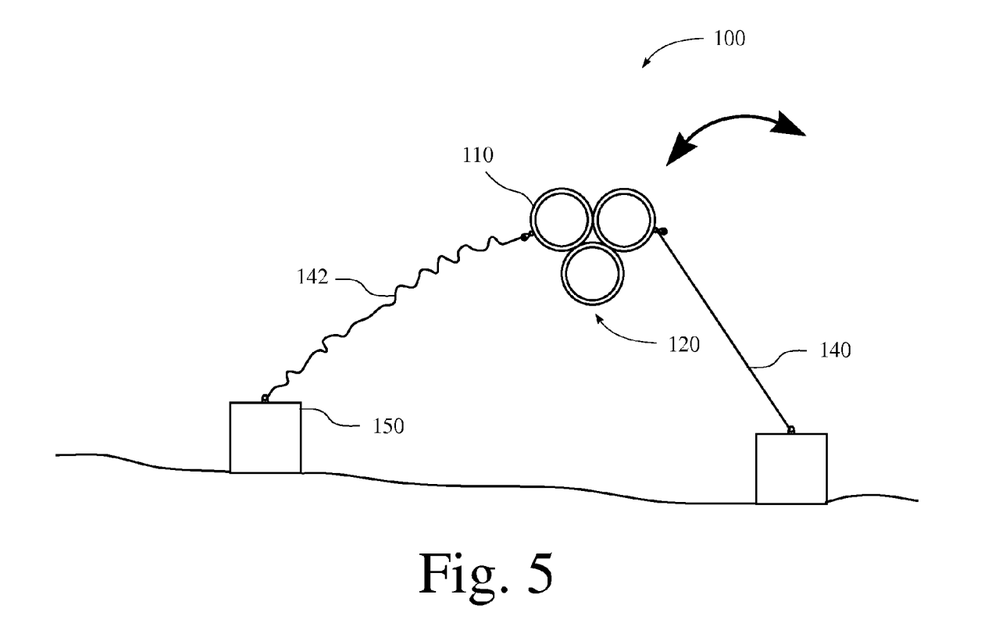
FIG. 5 is an end view of the wave attenuator additionally secured via an elasticized cable.

FIG. 5 is an end view of an alternative embodiment wave attenuator 100 additionally secured via an elasticized cable 142. In the illustrated embodiment, the wave attenuator 100 includes cables 140 having a fixed length positioned in the direction of the approaching waves. An elasticized cable 142 is positioned within the protected area. The protected area is generally opposite the approaching waves, that is, nearer to the shoreline, dock, harbor, and the like, for example.

Together the fixed cable 140 and the elasticized cable provide for maintaining the wave attenuator 100 in the desired position relative to the surface of the water. The elasticized cable 142 allows for the wave attenuator 100 to move in and away from the protected area, for example, while also remaining at the desired level along the surface of the water where the wave energy is greater. This provides for the wave attenuator 100 to self-adjust with regard to fluctuating water levels without the need for readjusting the cables to maintain the wave attenuator 100 level in relation to the water surface.

It should be noted that the illustrated embodiment of the elasticized configuration does not include a winch for adjusting cable tensions. A winch is not necessary for the elasticized cable 142 which provides for self adjustment of the wave attenuator 100 level with respect to the water surface. In such a configuration, a winch is optional for adjustments to the fixed-length cable 140.

Figure 6:
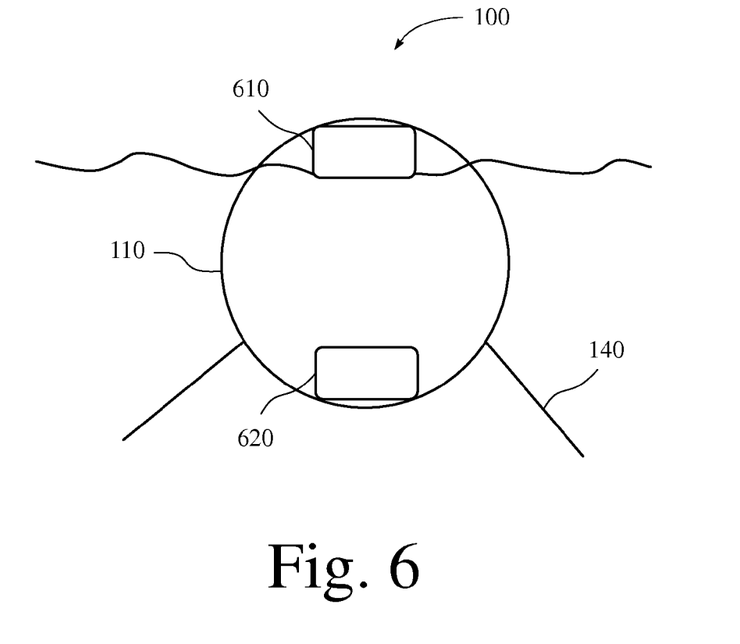
FIG. 6 is an end view of an alternative embodiment of a wave attenuator illustrating floats and ballasts.

FIG. 6 is an end view of an alternative embodiment of a wave attenuator 100 illustrating the use of floats 610 and/or ballasts 620 to adjust the buoyancy. The illustrated embodiment includes a wave attenuator 100 with a single elongated pipe 120 made up of pipe sections 110 connected end-to-end. Additional buoyancy is provided by adding flotation devices 610 within the pipe sections 110. Of course, the flotation device is lighter than water and floats near the upper portion within the pipe section 110.

In lighter weight pipe sections 110 where too little water is remaining with the pipe sections 110 so that the wave attenuator 100 is not situated at a low enough level relative to the water surface, additional ballast 620 is added to the pipe sections 110.

Figure 7:
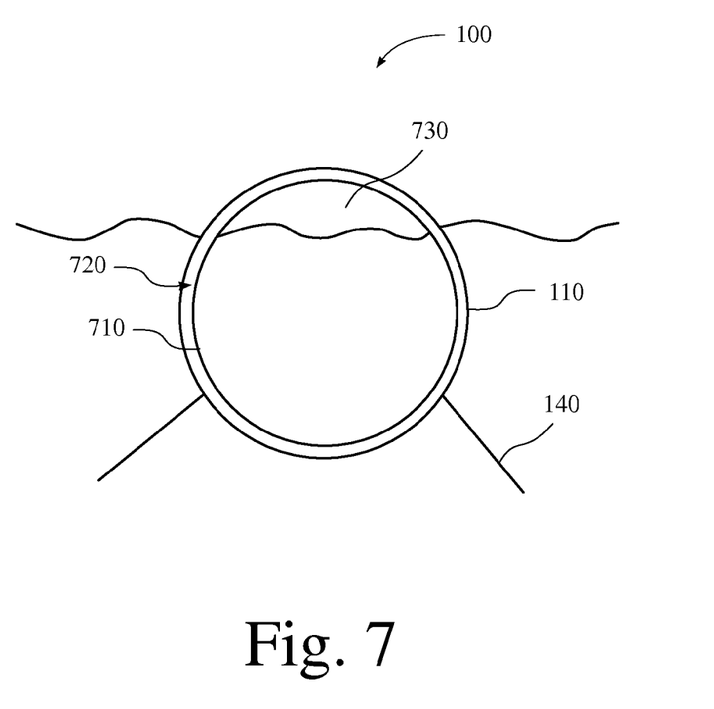
FIG. 7 is an end view of double-walled embodiment of a wave attenuator illustrating a pocket for improved buoyancy.

FIG. 7 is an end view of double-walled embodiment of a wave attenuator 100 illustrating a pocket for improved buoyancy. The wave attenuator 100 includes an inner wall 710 so that a space or pocket 720 is formed between the inner and outer walls of the pipe section 110. In such an embodiment, the pipe section 110 is typically a type of plastic that is suitable for such a purpose. In one embodiment, the pocket 720 is substantially filled with a material that is lighter than water to provide increased buoyancy to the pipe section 110. Of course, one such material is air. Of course, if the pipe section has too great a buoyancy, other materials can be added to the pocket 720 until a desired buoyancy is achieved so that the pipe section 110, and thus the wave attenuator 100, is at the desired level relative to the water surface.

The pipe section 110 also includes an air space 730 that increases or decreases in volume corresponding to the level of the wave attenuator relative to the water surface. If the buoyancy is too low, the air space 730 is larger. As the buoyancy increases, the air space 730 decreases in volume.

In a typical embodiment of the wave attenuator 100 having a double-walled pipe section 110, the pipe section 110 is a corrugated pipe 110.

Figure 8:
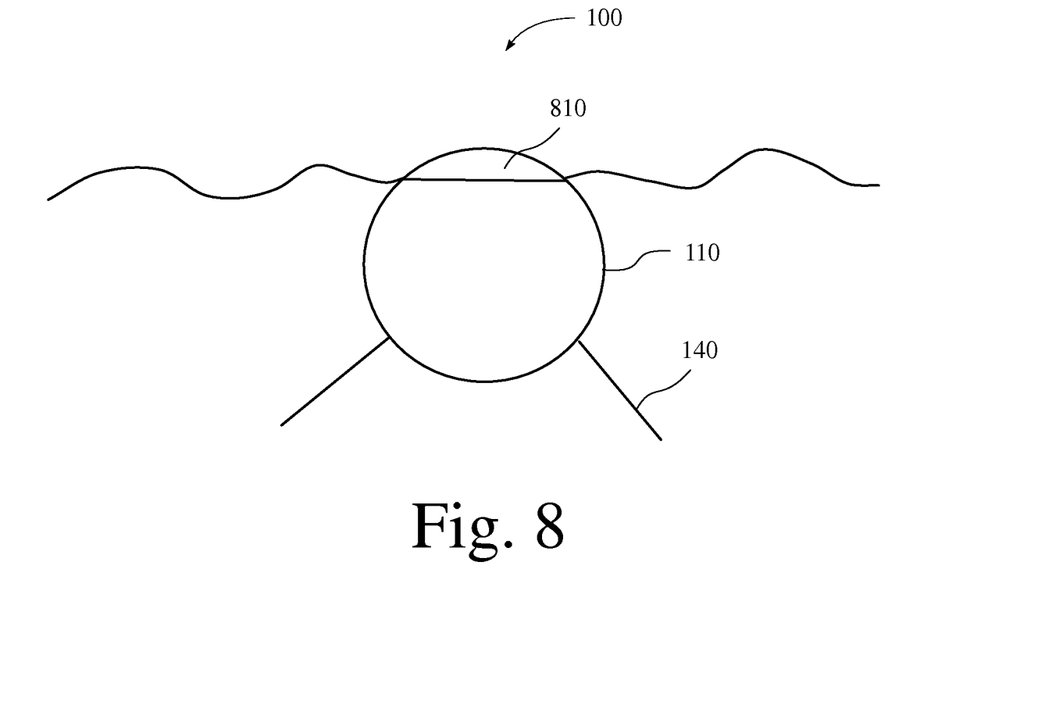
FIG. 8 is an end view of an alternative embodiment of a wave attenuator having a plugged area.
Figure 9:
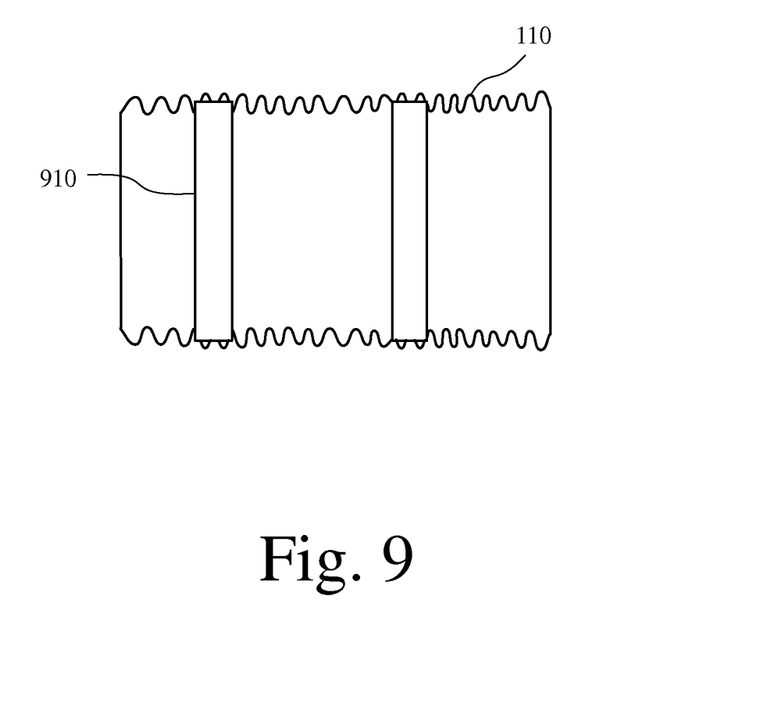
FIG. 9 is a side view of an alternative embodiment of a wave attenuator having pipe plugs for buoyancy.

FIG. 8 is an end view of an alternative embodiment of a wave attenuator 100 having a plugged space 810. The plugged space 810 is a location typically near the upper portion of the pipe section 110 which is filled with a material that is lighter than water. Such an area ensures that minimum amount of buoyancy will be maintained FIG. 9 is a side view of an alternative embodiment of a wave attenuator 100 having pipe plugs 910 for buoyancy. The pipe plugs 910 are filled with a material that provides a specified level of buoyancy to the pipe section 110. Additionally, the pipe plugs 910 are specifically located within the pipe section 110 to provide targeted results. In such an embodiment, the pipe plugs 910 provide for a specified amount of space within the pipe section 110 for greater control of the buoyancy.

From the foregoing description, it will be recognized by those skilled in the art that a floating wave attenuator 100 for dissipating the energy of waves approaching a dock, harbor, shoreline, and the like, has been provided While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A floating wave attenuator comprising:
a plurality of elongated pipes adjoined to form a continuous and contiguous substantially closed structure, each elongated pipe substantially parallel to each other elongated pipe within the plurality of elongated pipes, the plurality of elongated pipes secured together in a triangular formation as viewed from each end of the plurality of elongated pipes, each elongated pipe abutting along its length with at least two other elongated pipes within the triangular formation to form the substantially closed structure providing a continuous and contiguous cross sectional area;
each elongated pipe within the plurality of elongated pipes including a plurality of corrugated pipes, each corrugated pipe connected end-to-end with at least one other corrugated pipe, each corrugated pipe positioned within the respective elongated pipe so that each end of the respective corrugated pipe is offset from each end of any adjacent corrugated pipe;
a plurality of anchors, at least one of the anchors situated opposite another of the anchors having the substantially closed structure between opposing anchors; and
a plurality of anchor cables, at least one of the anchor cables situated opposite another of the anchor cables having the substantially closed structure between opposing anchor cables for directly securing a selected corrugated pipe of the substantially closed structure to the plurality of anchors,
so that the substantially closed structure is oriented substantially between a protected area and expected wave activity, and so that the continuous and contiguous cross sectional area provides for dissipation of the waves and reduction of wave energy.

2. The floating wave attenuator of claim 1, wherein the corrugated pipes are oriented substantially perpendicular to anticipated wave activity.

3. The floating wave attenuator of claim 1, each corrugated pipe further comprising a double-wall.

4. The floating wave attenuator of claim 3, wherein the double-wall includes space between walls, the space between walls configured to provide buoyancy to the corrugated pipe.

5. The floating wave attenuator of claim 4, further comprising air within the space between walls.

6. The floating wave attenuator of claim 4, further comprising a material within the space between walls, wherein the material is lighter than water.

7. The floating wave attenuator of claim 1, the plurality of anchor cables further including a plurality of anchor cable pairs, each anchor cable pair further including a first anchor cable of fixed length and a second anchor cable having elasticized length capacity, so that the first anchor cable provides a fixed reference depth for the floating wave attenuator relative to water surface and the second anchor cable provides for self-adjustment of the floating wave attenuator to maintain the reference depth during fluctuation of water levels.

8. The floating wave attenuator of claim 1, further comprising a detachable cover for each end of each elongated pipe, the cover providing a specified coverage of the respective end so that water flow into and out of the respective elongated pipe is reduced.

9. A floating wave attenuator comprising:
a plurality of elongated pipes substantially parallel to each other and adjoined to form a continuous and contiguous substantially closed structure, each elongated pipe further including:
a plurality of pipe sections, each pipe section connected end-to-end with at least one other pipe section, each pipe section positioned within the respective elongated pipe so that each end of the respective pipe section is offset from each end of any adjacent pipe section; and
an opening at each end of the elongated pipes, for providing the elongated pipes to be substantially filled with water due to wave activity; and
a triangular formation, wherein the elongated pipes are secured together in a substantially triangular formation as viewed from each end of the elongated pipes, wherein each elongated pipe abuts along its length with at least two other elongated pipes within the triangular formation to form the substantially closed structure having a continuous and contiguous cross sectional area;
a plurality of anchors, at least one of the anchors situated opposite another of the anchors having the substantially closed structure between opposing anchors; and
a plurality of anchor cables, at least one of the anchor cables situated opposite another of the anchor cables having the substantially closed structure between opposing anchor cables for directly securing a selected elongated pipe of the substantially closed structure to the plurality of anchors,
so that the substantially closed structure is oriented substantially between a protected area and an expected wave activity area, and so that the continuous and contiguous cross sectional area provides for dissipation of the waves and reduction of wave energy.

10. The floating wave attenuator of claim 9, wherein the pipe sections are oriented substantially perpendicular to anticipated wave activity.

11. The floating wave attenuator of claim 9, wherein each pipe section is a corrugated pipe.

12. The floating wave attenuator of claim 11, wherein each corrugated pipe further comprises a double-wall.

13. The floating wave attenuator of claim 12, wherein the double-wall includes space between walls, the space configured to provide buoyancy to the corrugated pipe.

14. The floating wave attenuator of claim 13, further comprising within the space between walls at least one of the following:
air;
a material lighter than water.

15. The floating wave attenuator of claim 9, the plurality of anchor cables including a plurality of anchor cable pairs, each anchor cable pair further including a first anchor cable of fixed length and a second anchor cable having elasticized length capacity, so that the first anchor cable provides a fixed reference depth for the floating wave attenuator relative to water surface and the second anchor cable provides for self-adjustment of the floating wave attenuator to maintain the reference depth during fluctuation of water levels.

16. The floating wave attenuator of claim 9, further comprising a detachable cover for each end of each elongated pipe, the cover providing a specified coverage of respective end so that water flow into and out of respective elongated pipe is reduced.

17. A method for wave attenuation, comprising:
assembling a plurality of elongated pipes via connecting a plurality of corrugated pipes end-to-end, wherein each elongated pipe has an opening at each end for water flow into and out of the elongated pipe;
securing the plurality of elongated pipes into a wave attenuator having a triangular formation as viewed from each end of the plurality of elongated pipes, each elongated pipe abutting along its length with at least two other elongated pipes within the triangular formation to form a continuous and contiguous substantially closed structure with a continuous and contiguous cross sectional area, and further positioning the plurality of elongated pipes so that each end of a respective corrugated pipe within a respective elongated pipe is offset from each end of any adjacent corrugated pipe;
positioning a plurality of anchors relative to the substantially closed structure with at least one of the anchors situated opposite another of the anchors and having the substantially closed structure between opposing anchors;
securing the wave attenuator in position relative to the wave activity area, via a plurality of anchor cables, at least one of the anchor cables situated opposite another of the anchor cables having the substantially closed structure between opposing anchor cables for direct attachment of a selected elongated pipe of the substantially closed structure to the plurality of anchors; and
orienting the wave attenuator between a protected area and an anticipated wave activity area so that the continuous and contiguous cross sectional area of the substantially closed structure provides for dissipation of the waves and reduction of wave energy.

18. The method for wave attenuation of claim 17, further comprising securing the wave attenuator via a first anchor cable of fixed length and a second anchor cable of elasticized length capacity, so that the first anchor cable provides a fixed reference depth for the wave attenuator relative to water surface and the second anchor cable provides for self-adjustment of the wave attenuator to maintain the reference depth during fluctuation of water levels.

* * * * *